US008417372B2

(12) United States Patent
Stanish

(10) Patent No.: US 8,417,372 B2
(45) Date of Patent: Apr. 9, 2013

(54) METHOD FOR OPTIMIZING VALUE OF WOOD PRODUCTS DRIED IN A DRYING PROCESS

(75) Inventor: Mark A. Stanish, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 415 days.

(21) Appl. No.: 12/913,198

(22) Filed: Oct. 27, 2010

(65) Prior Publication Data

US 2011/0270430 A1 Nov. 3, 2011

Related U.S. Application Data

(60) Provisional application No. 61/329,488, filed on Apr. 29, 2010.

(51) Int. Cl.
*G06F 19/00* (2011.01)
*G06F 11/30* (2006.01)
*G01N 37/00* (2006.01)

(52) U.S. Cl.
USPC .............. 700/208; 700/109; 702/84; 702/185

(58) Field of Classification Search .................. 700/104, 700/108, 109, 208, 274; 702/81, 84, 182, 702/183, 185; 34/282, 381, 396, 499
See application file for complete search history.

(56) References Cited

U.S. PATENT DOCUMENTS

| 6,202,320 | B1 * | 3/2001 | Chow | 34/381 |
| 7,286,956 | B2 * | 10/2007 | Floyd et al. | 702/183 |
| 7,324,904 | B2 * | 1/2008 | Floyd et al. | 702/81 |
| 7,584,652 | B2 * | 9/2009 | Floyd et al. | 73/73 |
| 8,266,073 | B2 * | 9/2012 | Duncan et al. | 705/400 |
| 2007/0143075 | A1 * | 6/2007 | Floyd et al. | 702/183 |
| 2008/0243270 | A1 * | 10/2008 | Jones et al. | 700/51 |
| 2010/0087950 | A1 * | 4/2010 | Wagner et al. | 700/208 |

OTHER PUBLICATIONS

Kuehl, R.O. (2000) "Design of Experiments: Statistical Principles of Research Design and Analysis", Duxbury Press.
Pinheiro, J.C., and Bates, D.M. (2000) "Mixed-Effects Models in S and S-PLUS", Springer, NY.

* cited by examiner

*Primary Examiner* — Charles Kasenge
(74) *Attorney, Agent, or Firm* — Weyerhaeuser Law Dept

(57) ABSTRACT

The present disclosure includes a method for optimizing value of current wood products dried in one or more current drying processes and associated computer software. The method comprises the steps of obtaining prior wood product data for prior wood products dried in one or more prior drying processes and generating a value function based on the prior wood product data. The method further includes identifying one or more sources of variability in the prior wood product data and quantifying a contribution to overall variability from each of the sources. The value function and the contributions to overall variability may be used to quantify one or more value opportunities associated with each the one or more sources, each value opportunity being associated with one or more executable steps for improving the one or more current drying processes.

20 Claims, 10 Drawing Sheets

METHOD FOR OPTIMIZING VALUE OF WOOD PRODUCTS DRIED IN A DRYING PROCESS

CROSS-REFERENCE TO RELATED APPLICATIONS

This application is entitled to and claims the benefit of priority under 35 U.S.C. §119 from U.S. Provisional Patent Application Ser. No. 61/329,488 filed Apr. 29, 2010, and titled "Method for Optimizing Value of Wood Products Dried in a Drying Process," the contents of which are incorporated herein by reference.

This application relates to U.S. patent application Ser. No. 12/913,160 filed on the same day as the present patent application, and titled "Method for Reducing Overall Variability of Moisture Content in Wood Products," the contents of which are incorporated herein by reference.

TECHNICAL FIELD

The present disclosure is directed generally to methods for optimizing value of wood products dried in a drying process and associated computer software.

BACKGROUND

When a log is sawn, the wood contains very large amounts of water. Accordingly products made from wood materials (e.g., lumber, veneer products, wood strand products) naturally contain moisture. Companies that manufacture such products seek to reduce this initial moisture content in order to avoid problems associated with dimensional stability, durability, appearance, shipping costs, fungal damage, and other issues.

Wood products are often classified and sorted into grades indicating quality and suitability for a particular use. In the lumber industry, formal grading systems are used to maintain standards so that lumber in a given grade can be used for the same application. Lumber grading is based on many factors including density, defects, and moisture content. Formal and informal grading systems based on similar factors also exist for veneers, strands, and other wood materials. Because higher grade materials generally sell for a premium price, moisture content is an important factor, which relates to product value.

Many companies that manufacture wood products employ various drying methods (e.g., kiln drying, air drying, shed drying) to reduce moisture content of their products before sale. Although companies use controlled drying processes and various monitoring technologies, it is difficult to ensure that every wood product dried in a given process will exhibit exactly the same moisture content after drying. In a kiln drying process, for example, moisture variations can result from variable drying conditions between different kilns at the same mill or within a single kiln charge. Accordingly, there is an opportunity to capture increased wood product value from improved management of moisture content. Thus, there is a need to develop a method for identifying sources of variability within drying processes for wood products and quantifying the contribution to variability from each of the sources.

SUMMARY

The following summary is provided for the benefit of the reader only and is not intended to limit in any way the invention as set forth by the claims. The present disclosure is directed generally towards methods for optimizing value of wood products dried in a drying process and associated software.

In one embodiment, the disclosure includes a method for optimizing value of current wood products dried in one or more current drying processes. The method comprises the steps of obtaining prior wood product data for prior wood products dried in one or more prior drying processes and generating a value function based on the prior wood product data. The value function expresses average value of a specified population of wood products in terms of the specified population's moisture content distribution. The method further includes identifying one or more sources of variability in the prior wood product data and quantifying a contribution to overall variability from each of the sources. The value function and the contributions may be used to quantify one or more value opportunities associated with each the one or more sources, each value opportunity being associated with one or more executable steps for improving the one or more current drying processes. In some embodiments, the method further comprises the steps of prioritizing the executable steps, selecting one or more executable steps based on prioritization, and performing one or more executable steps.

Further aspects of the disclosure are directed towards a computer-readable storage medium. The computer-readable storage medium stores computer-executable instructions that, when executed, by a processor of a computing system, cause the computing system to receive prior wood product data for prior wood products, the prior wood product data comprising moisture content data and grade data. The computing system quantifies a contribution to overall variability from each of one or more sources of variability and generates a value function based on the prior wood product data. The computing system further quantifies one or more value opportunities associated with each of the sources, each value opportunity being associated with one or more executable steps to be performed on current wood products being dried in a current drying process. In some embodiments, the computing system outputs a prioritization of the one or more executable steps, the prioritization being based on the quantified value opportunities.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows.

DETAILED DESCRIPTION

The present disclosure describes methods for optimizing value of wood products dried in a drying process and associated computer software. Certain specific details are set forth in the following description and FIGS. 3-10 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood product" is used to refer to a product manufactured from logs such as lumber (e.g., boards, dimension lumber, headers, beams, timbers, mouldings, laminated, finger jointed, or semi-finished lumber); veneer products; or wood strand products (e.g., oriented strand board, oriented strand lumber, laminated strand lumber, parallel strand lumber, and other similar composites); or components of any of the aforementioned examples. The term "drying process" is used to describe any process performed by a drying device for removing moisture from wood products including but not limited to kiln drying, air drying, shed drying, veneer drying, rotary-drum drying and other processes known to a person of ordinary skill in the art for removing moisture from wood. The term "variability" is used herein to describe the degree to which a set of data is spread out or clustered. The terms "current wood products" or "future wood products" are used to refer to wood products being dried currently or to be dried in the future. The term "prior wood products" is used to refer to wood products dried in the past.

The term "MBF" is used as an abbreviation for thousands of board feet. The term "MC" is used as an abbreviation for "moisture content." The term "MVP" is used as an abbreviation for "moisture-value profile." The term "MCDF" is used as an abbreviation for "moisture content distribution function."

Figure 1:
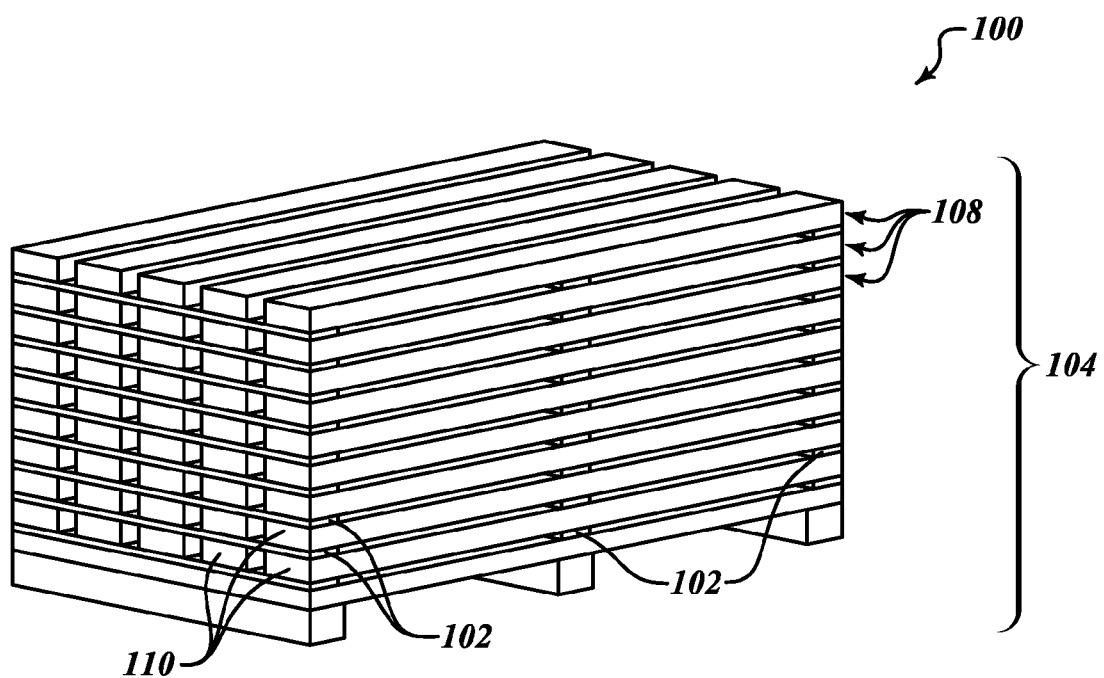
FIG. 1 is a schematic of a stack of lumber to illustrate terminology for lumber drying.

For simplification, the disclosure describes embodiments referencing application of the methods described in the lumber industry. FIG. 1 is a schematic describing common lumber drying terminology. FIG. 1 shows a stack of lumber 100 for kiln drying, shed drying, air drying, or use in other drying methods. Proper stacking will take advantage of wood's drying properties. The lumber stack 100 is generally uniform in length. Small uniform-sized boards known as "stickers" 102 are often used to provide space for air to move across the lumber surfaces.

In kiln drying, a "charge" includes all of the lumber put into the kiln at one time. A car is loaded with a lumber stack such as the one shown in FIG. 1. Multiple cars may be lined up on a track and some kilns are equipped with multiple tracks. Each charge comprises one or more packages 104. Each package 104 comprises one or more courses 108. Courses 108 are individual rows that make up a package 102. Each course 108 comprises one or more pieces 110. Pieces 110 are individual components of the wood product. In the lumber example, a piece 110 may be a single board. A person of ordinary skill in the art will understand that the methods described herein may be applied to other wood products not specifically mentioned in the disclosure. Furthermore, embodiments described in the disclosure may be used with drying processes not specifically mentioned, but that would be known to a person of ordinary skill in the art.

Figure 2:
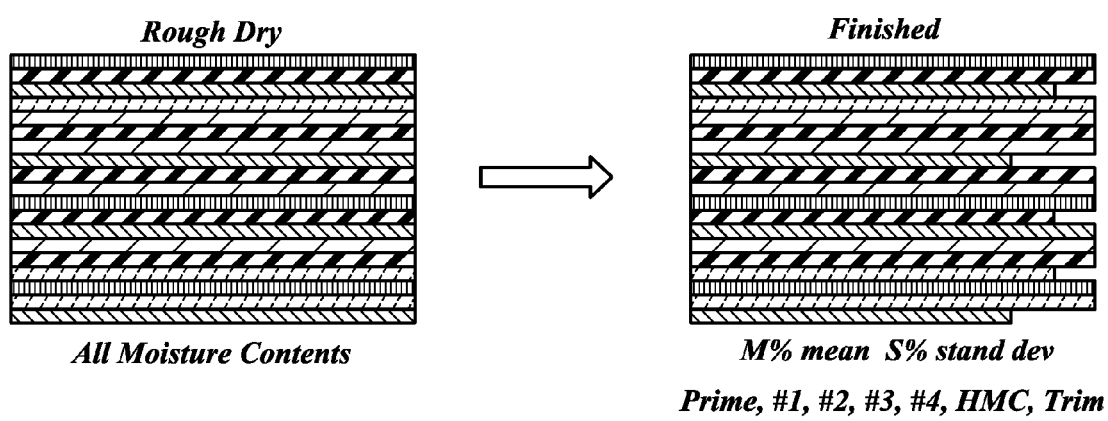
FIG. 2 depicts a conventional "grade-out" approach to wood product quality and value assessment.

In lumber manufacturing, product quality and value are commonly assessed using grading data from planer mills. Reports are generated in the form of a so-called "grade-out," which provides a breakdown of the volume percentage of each grade in a certain lumber population. That population may be from a single planer shift, or it could be from some other production interval (e.g., a week, a month, etc). FIG. 2 depicts a conventional "grade-out" approach to wood product quality and value assessment.

The grade-out depends in part on the moisture content characteristics of the corresponding lumber population. Populations with higher average moisture contents generally have higher proportions of Wet or High Moisture Content (HMC) grades. Those with lower moisture contents have a greater incidence of drying-related degrade, including warp, splits, checks, and planer skip, and therefore have higher proportions of lower-value grades. To help account for the effects of moisture content on grade-out, the moisture content distribution or related statistical metrics (mean and standard deviation) may be compiled and reported along with the grade-out.

In general, drying outcomes differ in average moisture content and/or in moisture content variability, both of which influence value. For drying improvement, the differences in value that result from differences in moisture content are often especially important. Using grade-outs to establish lumber value in such comparisons is challenging because the moisture content distributions of the grade-out populations usually do not closely match the distributions under consideration. Furthermore, even when those moisture content distributions are very similar, it can be difficult to determine value accurately because of the variability that is caused by factors other than moisture content. For both reasons, grade-outs are of limited use for resolving value differences between different drying outcomes. Accordingly, there is an opportunity to capture increased lumber value from improved management of moisture content. This opportunity can be viewed as consisting of two components: (a) that from optimal targeting of final moisture content, to better balance value losses due to over-drying and under-drying and thus provide maximum value at the existing level of moisture content variability; and (b) that from controlling or impacting moisture content variability (standard deviation) to further increase average lumber value.

Figure 3:
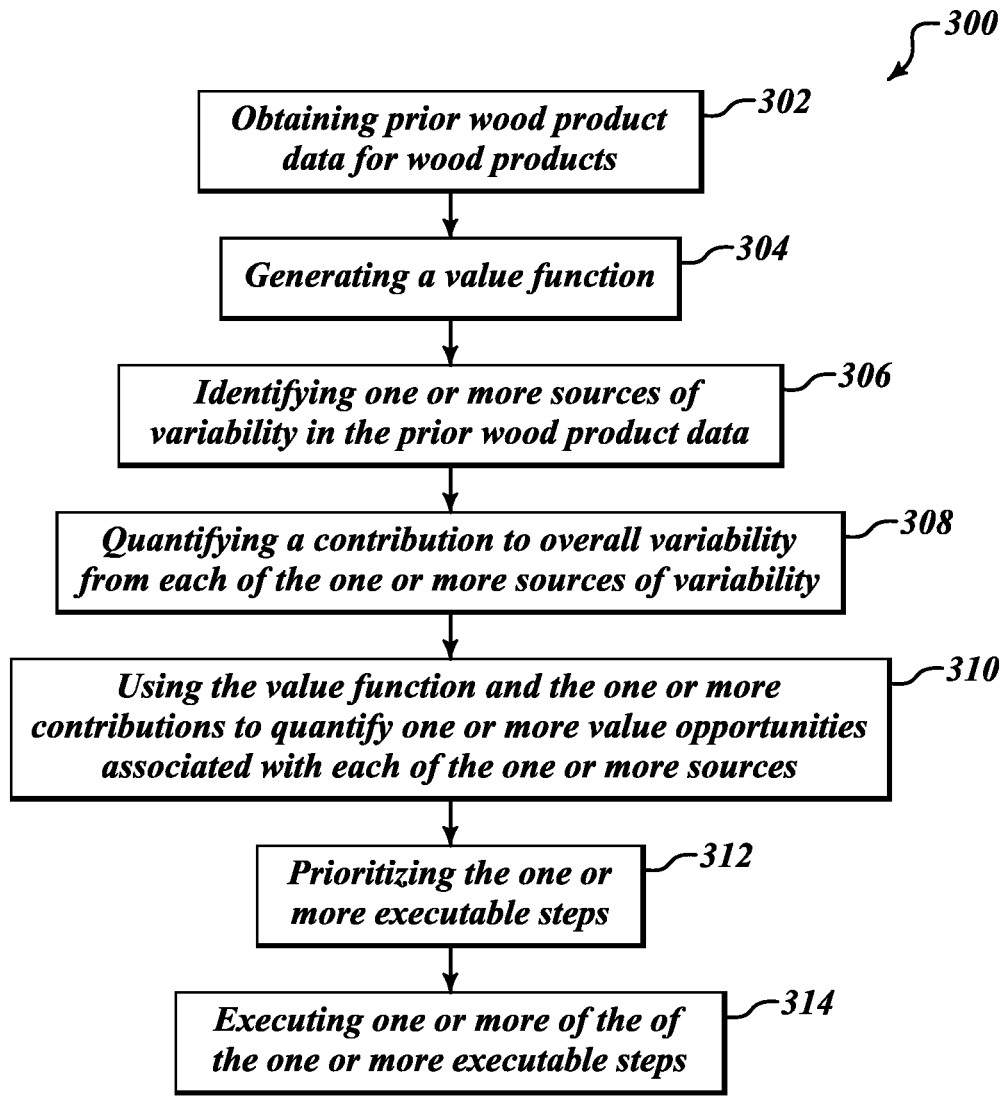
FIG. 3 is a schematic of a method for optimizing value of wood products according to the disclosure.

FIG. 3 is a schematic for a method 300 for optimizing value of current wood products dried in one or more current drying process according to the disclosure. The method begins with step 302, obtaining prior wood product data for prior wood products dried in one or more prior drying processes (e.g., kiln drying). In some embodiments, prior wood product data includes only moisture content. In some embodiments, prior wood product data may include moisture content data, grade data, trim data, or other data that a person of ordinary skill in the art could correlate to value. Prior wood product data may be obtained using any methods and/or equipment that is known to a person of ordinary skill in the art.

Figure 4:
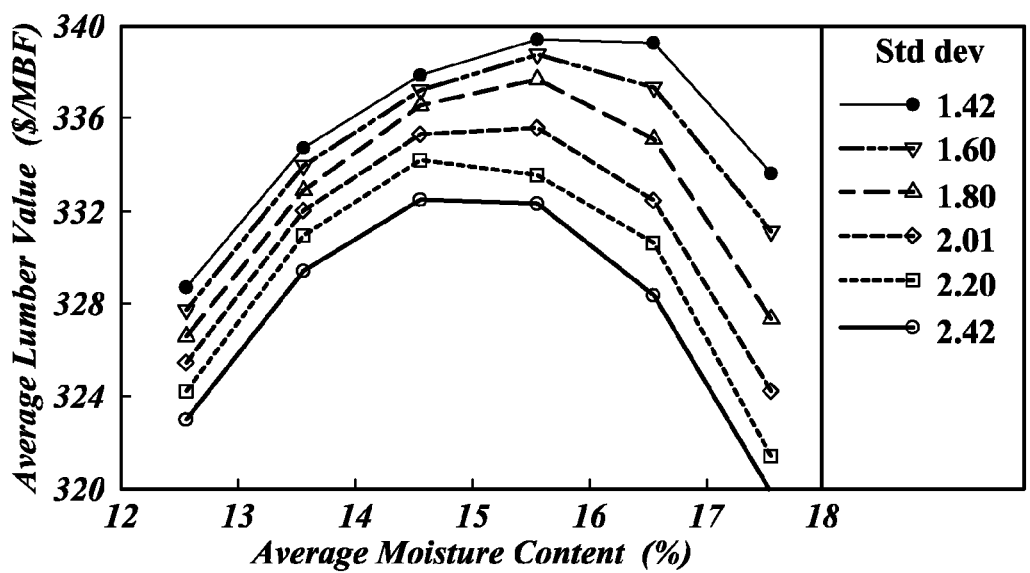
FIG. 4 is a plot of average lumber value versus average moisture content.

Step 304 includes generating a value function based on the prior wood product data. The value function expresses average value of a specified population of wood products in terms of the specified population's moisture content distribution. FIG. 4 is an example of a value function generated based on prior wood product data gathered at Weyerhaeuser's Greenville Mill in Plymouth, N.C. FIG. 4 is simply one example of a value function which shows how variability affects value of lumber by plotting average lumber value versus average moisture content. Other methods for expressing this relationship are envisioned as part of the disclosure. Methods for generating value functions according to embodiments of the disclosure will now generally be described.

Figure 5:
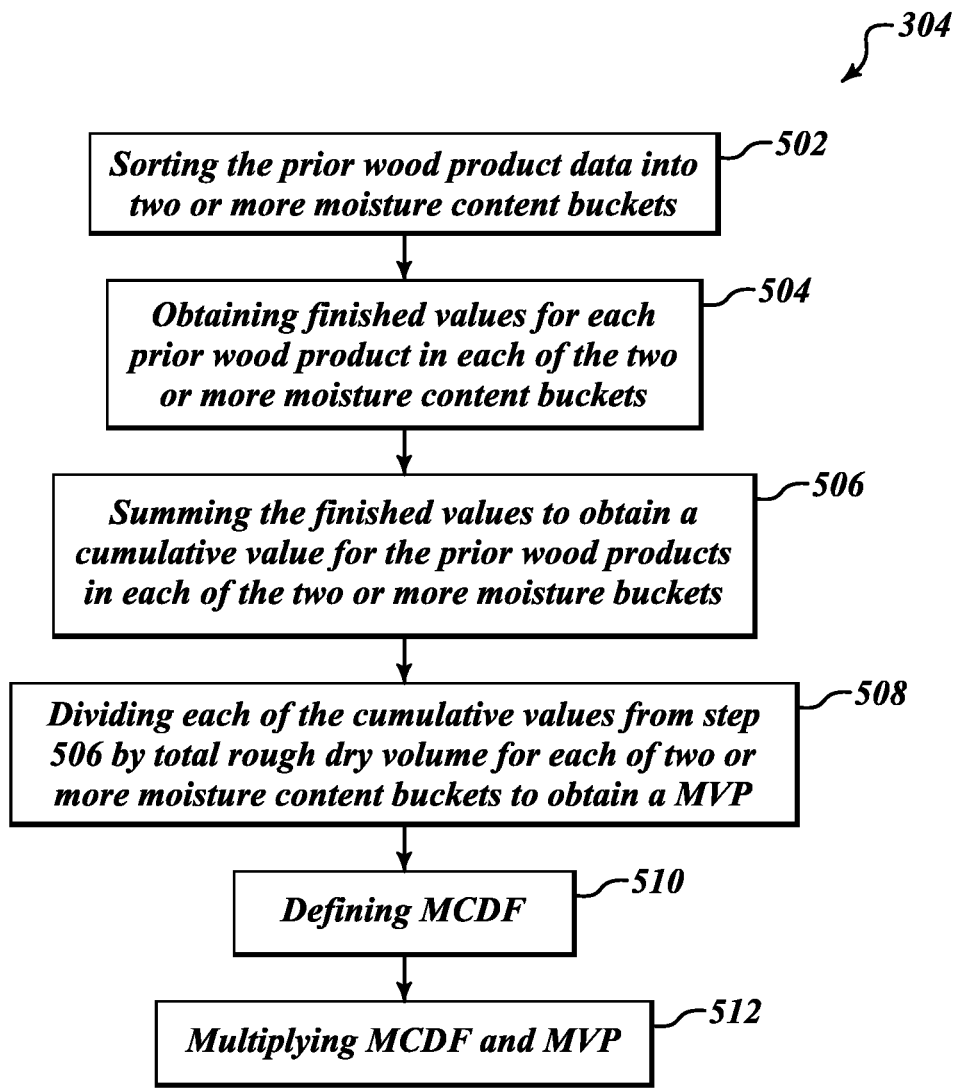
FIG. 5 is a schematic for generating a value function according to embodiments of the disclosure.
Figure 6:
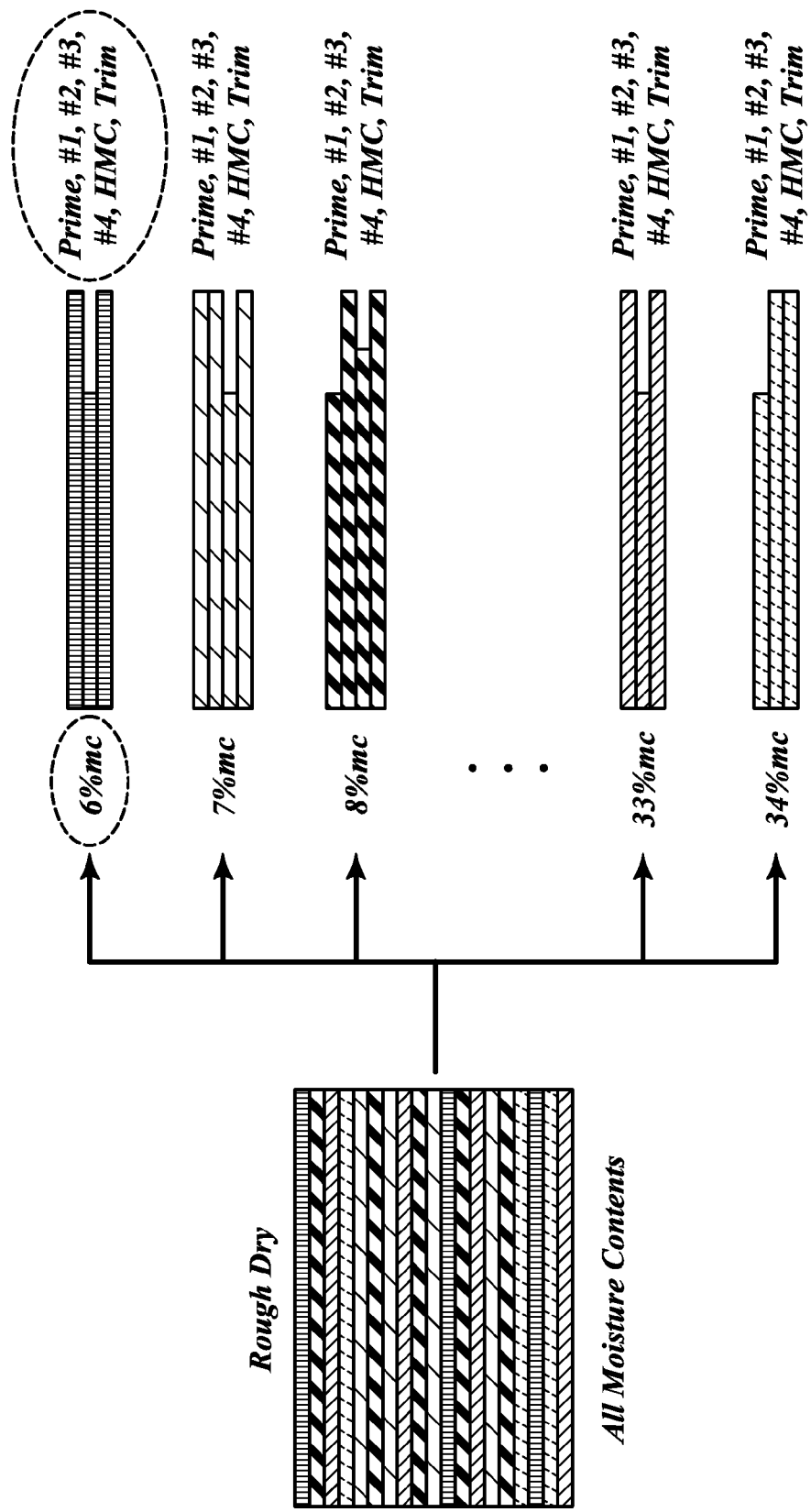
FIG. 6 schematically illustrates sorting prior wood product data according to embodiments of the disclosure.

FIG. 5 is a schematic for a method 304 for generating a value function according to embodiments of the disclosure. The method 304 begins with step 502, sorting the prior wood product data into two or more moisture content buckets. To determine value for particular moisture contents, the distribution of finished grades is determined for lumber populations having a very narrow range of moisture contents, such as +/−0.5% MC. In some embodiments, prior wood product data are sorted into moisture buckets of one percent moisture content. For example, prior wood product data may be grouped into moisture content buckets having the following ranges: 6.0-6.9% MC, 7.0-7.9% MC, 8.0-8.9% MC, etc. FIG. 6 shows an example of sorting prior wood product data. A person of ordinary skill in the art will appreciate that one can sort prior wood product data into any number of moisture content buckets having various ranges.

Figure 7:
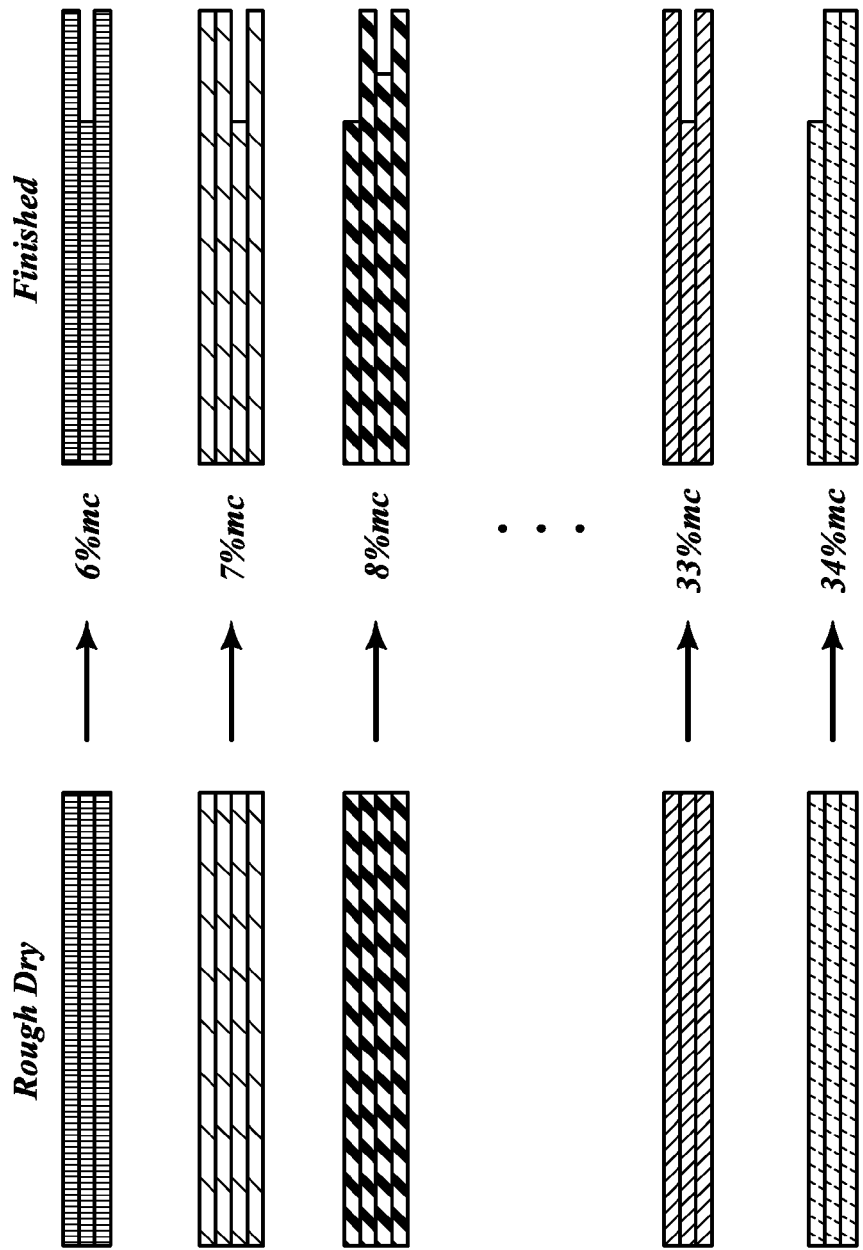
FIG. 7 schematically illustrates determining finished value of prior wood products according to embodiments of the disclosure.

Step 504 includes obtaining finished values for each prior wood product in each of the two or more moisture content buckets. The value of each finished piece in each moisture content bucket may be determined from its grade and length and the corresponding price, as illustrated in FIG. 7. In embodiments where trim data is included in prior wood product data, trim losses may be considered in determining finished values. In some embodiments, trim losses may be disregarded. Finished values for each prior wood product may be purchased from a third party or obtained using other methods known to a person of ordinary skill in the art.

Figure 8:
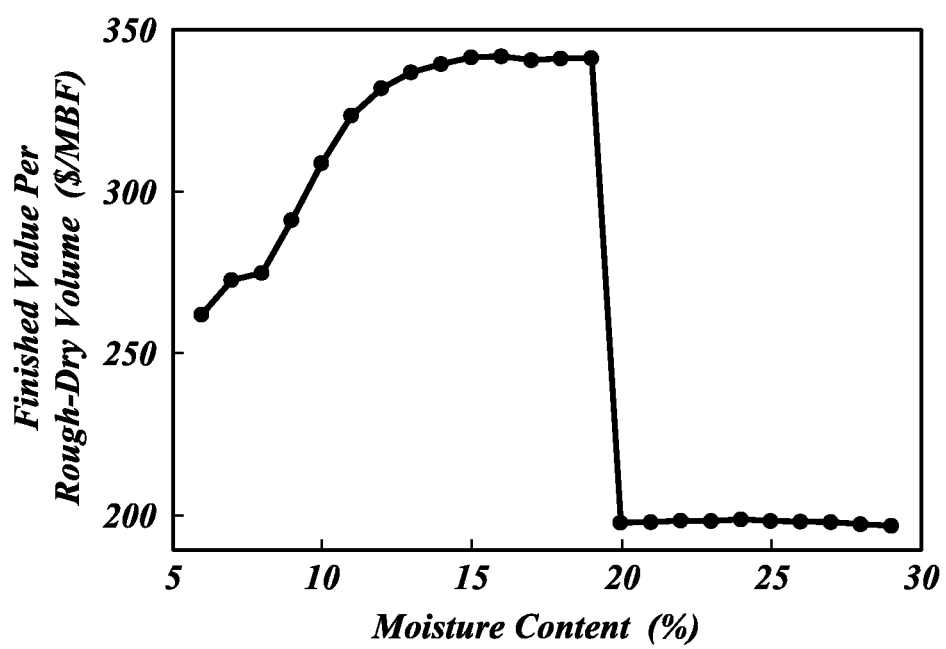
FIG. 8 is a plot of finished value of rough dry lumber against moisture content.
Figure 9:
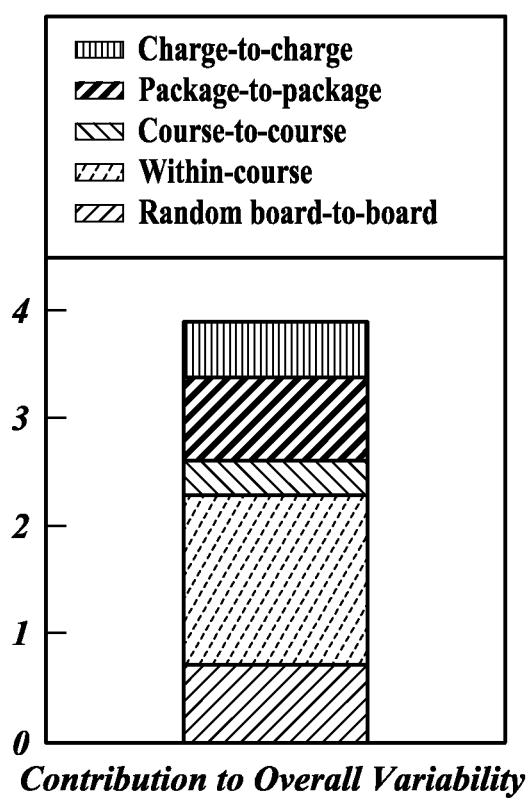
FIG. 9 is a bar chart summarizing the quantification of contributions to overall variability from each of the sources.

Referring back to FIG. 5, step 506 includes summing the finished values (obtained in step 504) to obtain a cumulative value for the prior wood products in each of the two or more moisture buckets. In step 508, the cumulative values from step 506 are divided by total rough dry volume for each of the two or more moisture content buckets. The results for all of the moisture content buckets may be plotted in a graph showing value as a function of moisture content, which reveals the detailed impacts of differing moisture content on ultimate lumber value. FIG. 8 shows an example of this relationship, which is broadly referred to as a moisture-value profile (MVP).

Referring back to FIG. 5, methods 304 for generating a value function further include step 510, defining a moisture content distribution function (MCDF). A MCDF describes the range of possible values that the moisture content can attain and the probability that a moisture content value is within any subset of that range. One can obtain a value function by multiplying the MVP and MCDF as shown below in Equation 1.

$$V = \int v(mc) * p(mc)$$ Equation 1

In Equation 1, V represents the value function. The term v(mc) represents the moisture-value profile or MVP. The term p(mc) represents the moisture content distribution function or MCDF.

Referring back to FIG. 3, step 306 includes identifying one or more sources of variability in the prior wood product data. In some embodiments, the sources of variability include charge-to-charge differences, package-to-package differences, course-to-course differences, within-course differences, and piece-to-piece differences. In some embodiments, sources of variability may include one of the above-mentioned sources or any combination of the above-mentioned sources. In lumber applications, charge-to-charge differences are, for example, variability in moisture content between individual kiln charges. Package-to-package differences are, for example, variability in moisture content between individual packages. Course-to-course differences are, for example, variability in moisture content between individual courses. Within-course differences are, for example, variability in moisture content within individual courses. Piece-to-piece differences are, for example, variability in moisture content between individual wood products (boards, in the case of lumber). A person of ordinary skill in the art will appreciate that modified terminology may be used in non-lumber applications to refer to sources of variability in moisture content for wood products.

Figure 10:
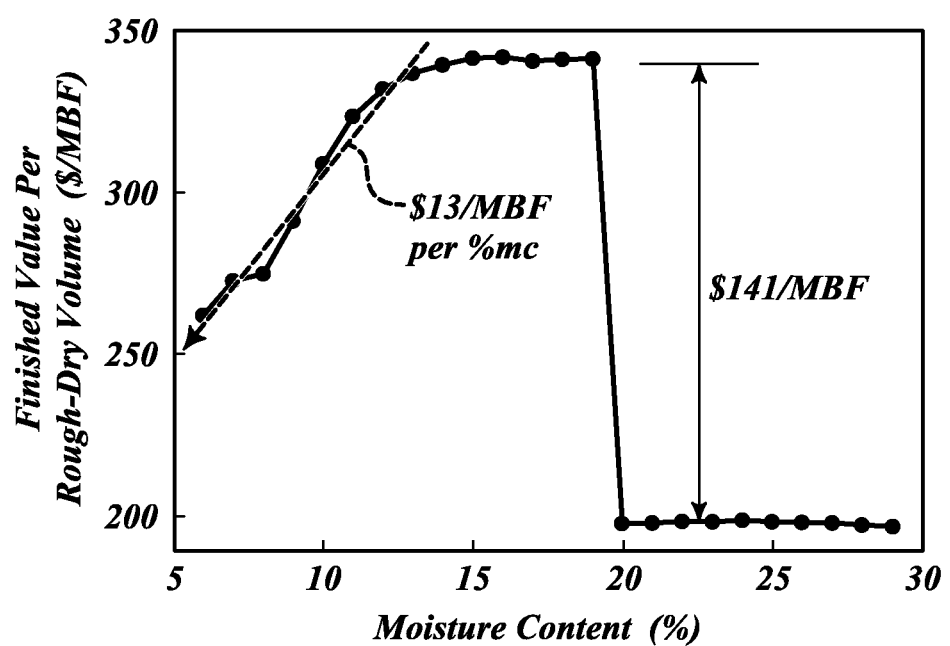
FIG. 10 is a plot of finished value of rough dry lumber against moisture content.

Step 308 includes quantifying a contribution to overall variability from each of the sources of variability. A variety of methods may be used to quantify the contribution from each of these sources to the overall variability. For example, in embodiments according to the disclosure, graphical, statistical, and computational methods may be used to quantify contribution to overall variability. Examples of methods for quantifying contribution to overall variability are described, for example, in U.S. patent application Ser. No. 12/913,160, the contents of which are incorporated herein by reference. FIG. 10 is a bar chart summarizing the quantification of contributions to overall variability from each of the sources.

Referring back to FIG. 3, step 310 includes using the value function and the contributions to variability to quantify one or more value opportunities associated with each of the one or more sources. Each value opportunity is associated with one or more executable steps for improving the one or more current drying processes. For example, in a kiln application, executable steps may include actions such as altering charge time for a kiln, altering airflow in a kiln, sorting wood products before drying, altering how wood products are stacked, adjusting temperature, repairing a malfunctioning component, changing fan configuration, or other steps which may affect overall variability or value of the wood products. Similar executable steps may be applied in situations which involve drying processes and drying devices other than kilns. For example other drying devices may include veneer dryers or rotary dryers. Other drying processes may include air drying or shed drying. A person of ordinary skill in the art will appreciate that executable steps not explicitly listed herein are contemplated to be within the scope of the disclosure.

Once the various contributions have been quantified, it is possible to use MVP analysis to estimate which value opportunities exists in association with executing a step to impact the contribution from a particular source. Referring back to FIG. 8, one can determine a value opportunity (in $/MBF) associated with each source of variability by locating the value associated with each contribution to overall variability. This is done by determining the contribution to overall variability associated with each source and using the MVP to determine the expected impact on value. An example of value opportunities associated with sources is shown in Table 1.

TABLE 1

| Value Opportunities | | |
|---|---|---|
| Source of variability | Contribution to overall variability (standard dev) | Value opportunity ($/MBF) |
| Charge-to-charge differences | 0.5% MC | $2.10 |

TABLE 1-continued

Value Opportunities

| Source of variability | Contribution to overall variability (standard dev) | Value opportunity ($/MBF) |
|---|---|---|
| Package-to-package differences | 0.8% MC | $3.20 |
| Course-to-course differences | 0.3% MC | $1.60 |
| Within-course differences | 1.6% MC | $6.30 |
| Piece-to-piece differences | 0.7% MC | $2.80 |
| Total | 3.9% MC | |

Although Table 1 shows value opportunities associated with a specific set of sources (e.g., charge-to-charge differences, package-to-package differences, course-to-course differences, within-course differences, and piece-to-piece differences), a person of ordinary skill in the art will appreciate that different combinations of sources of variability may be considered. Accordingly, terminology for such sources may differ depending on the application (e.g. lumber, veneers, strand, etc.).

Referring again to FIG. 3, step 312 includes prioritizing the one or more executable steps based on the value opportunities. Executable steps may include, for example, altering charge time for a drying process, altering airflow in a drying processes, sorting wood products before drying, altering how wood products are stacked, adjusting temperature, repairing a malfunctioning component, changing fan configuration, or other steps which may affect overall variability or value of the wood products. Such a prioritization may optionally be displayed on a computer screen or other suitable display mechanism.

As depicted in step 314, the wood product manufacturing company may choose to optionally execute one or more of the executable steps. For example with respect to Table 1, if charge-to-charge, package-to-package, and course-to-course differences could be largely eliminated by improved kiln endpoint control and drying uniformity, standard deviation would be reduced from about 3.9% mc to about 2.3% mc. From MVP analysis estimates, a reduction in moisture content variability of this magnitude could translate into a rise in average lumber value of about $7/MBF.

One can also use the MVP from step 506 to quantify the impacts of over-drying and under-drying on ultimate lumber value. Referring to FIG. 10, the impact of under-drying is given by the sharp drop in value at the HMC grade moisture content threshold, as illustrated in FIG. 10 where the ultimate value of rough-dry 2×12's drops from about $340/MBF to about $200/MBF. The impact of over-drying is revealed at low moisture contents as a continuous decline in value with decreasing moisture content. For example, in FIG. 10, the ultimate value of 2×12's drops by about $13/MBF for every incremental one percent reduction in moisture content below about 13% MC.

Those skilled in the art will appreciate that methods described in the disclosure may be implemented on any computing system or device. Suitable computing systems or devices include personal computers, server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed as desired in various embodiments.

From the foregoing, it will be appreciated that the specific embodiments of the disclosure have been described herein for purposes of illustration, but that various modifications may be made without deviating from the disclosure. For example, modifications to the methods for expressing or quantifying value opportunities may be made without departing from the spirit of the disclosure. Additionally, value functions may be generated using methods not explicitly disclosed, but that are traditionally used by those of ordinary skill in the art. Words in the above disclosure using the singular or plural number may also include the plural or singular number, respectively. For example, a reference to a drying process could also apply to multiple drying processes, multiple drying devices, a single drying device, or various combinations thereof.

Aspects of the disclosure described in the context of particular embodiments may be combined or eliminated in other embodiments. For example, embodiments applied in one drying process (e.g., a kiln) or to a particular wood product (e.g., lumber) may be applied to other types of wood products (e.g., veneers) in other types of drying processes (e.g., air drying). In addition, sources of variability quantified according to methods described in the disclosure may include charge-to-charge differences, package-to-package differences, course-to-course differences, within-course differences, piece-to-piece differences, or any combination of these sources.

Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

I claim:

1. A method for optimizing value of current wood products dried in one or more current drying processes, the method comprising the steps of:
    (a) obtaining prior wood product data for prior wood products dried in one or more prior drying processes;
    (b) generating a value function based on the prior wood product data, the value function expressing average value of a specified population of wood products in terms of the specified population's moisture content distribution;
    (c) identifying one or more sources of variability in the prior wood product data;
    (d) quantifying a contribution to overall variability from each of the one or more sources of variability; and
    (e) using the value function and the one or more contributions to overall variability to quantify one or more value opportunities associated with each of the one or more sources, each value opportunity being associated with one or more executable steps for improving the one or more current drying processes; and
(f) drying the current wood products in the one or more current drying processes, the one or more current drying processes being determined by the one or more value opportunities and the one or more executable steps.

2. The method of 1, further comprising the step of:
(g) prioritizing the one or more executable steps; and
(h) displaying the prioritization from step (g).

3. The method of claim 1 wherein the prior wood product data comprises moisture content data and grade data.

4. The method of claim 3 wherein the prior wood product data further comprises trim data.

5. The method of 1 wherein the one or more sources of variability comprise charge-to-charge differences, package-to-package differences, course-to-course differences, within-course differences, and piece-to-piece differences.

6. The method of claim 1 wherein step (b) comprises the steps of:
(i) sorting the prior wood product data into two or more moisture content buckets;
(ii) obtaining finished values for each prior wood product in each of the two or more moisture content buckets;
(iii) summing the finished values to obtain a cumulative value for the prior wood products in each of the two or more moisture buckets;
(iv) dividing each of the cumulative values from step (iii) by total rough dry volume for each of the two or more moisture content buckets to obtain a moisture-value profile (MVP), the MVP being an expression of value as a function of moisture content;
(v) defining a moisture content distribution function (MCDF), the MCDF describing a range of possible values that moisture content can attain in the specified population and a probability that a moisture content value is within any subset of the range; and
(vi) multiplying, using the processor, the MCDF and the MVP to obtain a value function.

7. The method of claim 6, further comprising the step of using the MVP to quantify effects of over-drying and/or under-drying the current wood products.

8. The method of claim 1 wherein the current wood products and the prior wood products are selected from the group consisting of lumber, veneers, fiber, strands, and other products manufactured from logs.

9. The method of claim 8 wherein the one or more current drying processes and the one or more prior drying processes are performed by one or more kilns, veneer dryers, or rotary-drum dryers.

10. A method for optimizing value of current wood products dried in one or more drying devices, the method comprising the steps of:
(a) obtaining prior wood product data for prior wood products dried in one or more prior drying processes;
(b) generating a value function based on the prior wood product data, the value function expressing average value of a specified population of wood products in terms of the specified population's moisture content distribution;
(c) identifying one or more sources of variability in the prior wood product data;
(d) quantifying a contribution to overall variability from each of the one or more sources of variability;
(e) using the value function and the one or more contributions to overall variability to quantify one or more value opportunities associated with each of the one or more sources, each value opportunity being associated with one or more executable steps for improving function of the one or more drying devices;
(f) prioritizing the one or more executable steps;
(g) selecting one or more of the executable steps based on prioritization from step (f); and
(h) performing the one or more executable steps selected in step (g) on the one or more drying devices or on the current wood products.

11. The method of claim 10 wherein the prior wood product data comprises moisture content data, grade data, and trim data.

12. The method of 10 wherein the one or more sources of variability comprise charge-to-charge differences, package-to-package differences, course-to-course differences, within-course differences, and piece-to-piece differences.

13. The method of claim 10 wherein step (b) comprises the steps of:
(i) sorting the prior wood product data into two or more moisture content buckets;
(ii) obtaining finished values for each prior wood product in each of the two or more moisture content buckets;
(iii) summing the finished values to obtain a cumulative value for the prior wood products in each of the two or more moisture buckets;
(iv) dividing each of the cumulative values from step (iii) by total rough dry volume for each of the two or more moisture content buckets to obtain a moisture-value profile (MVP), the MVP being an expression of value as a function of moisture content;
(v) defining a moisture content distribution function (MCDF), the MCDF describing a range of possible values that moisture content can attain in the specified population and a probability that a moisture content value is within any subset of the range; and
(vi) multiplying the MCDF and the MVP obtain a value function.

14. The method of claim 10 wherein the current wood products and the prior wood products are selected from the group consisting of lumber, veneers, fiber, strands, and other products manufactured from logs.

15. The method of claim 10 wherein the one or more executable steps comprise:
altering how the current wood products are stacked; and
sorting the current wood products before the current wood products are dried in the one or more drying devices.

16. The method of claim 10 wherein the one or more executable steps comprise:
altering charge time for the one or drying devices;
altering airflow in the one or more drying device;
repairing a malfunctioning component in the one or more drying devices;
altering temperature in the one or more drying devices; and
changing fan configuration in the one or more drying devices.

17. The method of claim 10 wherein the one or more drying devices are kilns, veneer dryers, or rotary-drum dryers.

18. A computer-readable storage medium storing computer-executable instructions that, when executed, by a processor of a computing system, cause the computing system to:
receive, using the processor, prior wood product data for prior wood products, the prior wood product data;
quantify, using the processor, a contribution to overall variability from each of one or more sources of variability;
generate, using the processor, a value function based on the prior wood product data, the value function expressing average value of a specified population of wood products in terms of the specified population's moisture content distribution;

quantify, using the processor, one or more value opportunities associated with each of the one or more sources, each value opportunity being associated with one or more executable steps to be performed on current wood products being dried in a current drying process; and output, using the processor, a prioritization of the one or more executable steps, the prioritization being based on the one or more quantified value opportunities.

19. The computer readable storage medium of claim 18 wherein the one or more sources of variability comprise charge-to-charge differences, package-to-package differences, course-to-course differences, within-course differences, and piece-to-piece differences.

20. The computer-readable storage medium of claim 18 wherein the value function is generated by computer-executable instructions that, when executed cause the computing system to:

sort, using the processor, the prior wood product data on moisture content into two or more moisture content buckets;

receive finished values for each prior wood product in each of the two or more moisture content buckets;

sum, using the processor, the finished values to obtain a cumulative value for the prior wood products in each of the two or more moisture buckets;

divide, using the processor, each of the cumulative values by total rough dry volume for each of the two or more moisture content buckets to obtain a moisture-value profile (MVP), the MVP being an expression of value as a function of moisture content;

define a moisture content distribution function (MCDF), the MCDF describing a range of possible values that moisture content can attain in the specified population and a probability that a moisture content value is within any subset of the range; and multiply, using the processor, the MCDF and the MVP to obtain a value function.

* * * * *